(12) United States Patent
Centen et al.

(10) Patent No.: US 9,188,663 B2
(45) Date of Patent: Nov. 17, 2015

(54) TIME-OF-FLIGHT IMAGER

(75) Inventors: Peter Centen, Goirle (NL); Klaas Jan Damstra, Breda (NL); Jeroen Rotte, Breda (NL); Juul Van Den Heijkant, Raamsdonkveer (NL)

(73) Assignee: THOMSON LICENSING, Issy Moulineaux (FR)

( * ) Notice: Subject to any disclaimer, the term of this patent is extended or adjusted under 35 U.S.C. 154(b) by 311 days.

(21) Appl. No.: 13/134,089

(22) Filed: May 28, 2011

(65) Prior Publication Data

US 2011/0304696 A1    Dec. 15, 2011

(30) Foreign Application Priority Data

Jun. 9, 2010    (EP) ..................................... 10305613

(51) Int. Cl.
*H04N 13/02*    (2006.01)
*G01S 7/497*    (2006.01)
*G01S 17/89*    (2006.01)

(52) U.S. Cl.
CPC ........... *G01S 7/497* (2013.01); *G01S 17/89* (2013.01)

(58) Field of Classification Search
CPC .................................. G01S 7/497; G01S 17/89
USPC ..................................... 348/43, 46; 382/154
See application file for complete search history.

(56) References Cited

U.S. PATENT DOCUMENTS

| | | | |
|---|---|---|---|
| 5,047,777 A | 9/1991 | Metzdorff et al. | |
| 5,087,916 A | 2/1992 | Metzdorff et al. | |
| 5,136,297 A | 8/1992 | Lux et al. | |
| 5,796,363 A * | 8/1998 | Mast | 342/22 |
| 5,835,054 A * | 11/1998 | Warhus et al. | 342/22 |
| 5,978,081 A | 11/1999 | Michael et al. | |
| 6,531,881 B1 * | 3/2003 | Cordes et al. | 324/644 |
| 6,749,570 B2 * | 6/2004 | Ustuner et al. | 600/443 |
| 6,778,219 B1 | 8/2004 | Seo et al. | |
| 7,167,124 B2 * | 1/2007 | Annan et al. | 342/22 |
| 7,224,384 B1 | 5/2007 | Iddan et al. | |
| 7,724,925 B2 * | 5/2010 | Shepard | 382/115 |
| 8,194,995 B2 * | 6/2012 | Wong et al. | 382/255 |
| 8,208,129 B2 * | 6/2012 | Yahav et al. | 356/4.01 |
| 8,355,565 B1 * | 1/2013 | Yang et al. | 382/154 |
| 8,456,517 B2 * | 6/2013 | Spektor et al. | 348/43 |

(Continued)

FOREIGN PATENT DOCUMENTS

| | | |
|---|---|---|
| JP | 06058755 | 3/1994 |
| JP | 09021871 | 1/1997 |

(Continued)

OTHER PUBLICATIONS

Fife et al., "A 0.5 mm Pixel Frame-Transfer CCD Image Sensor in 100nm CMOS", Electron Devices Meeting, 2007, IEDM 2007, Dec. 10, 2007, pp. 1003-1006.

(Continued)

*Primary Examiner* — Christopher S Kelley
*Assistant Examiner* — Deirdre Beasley
(74) *Attorney, Agent, or Firm* — Tutunjian & Bitetto, P.C.

(57) ABSTRACT

An improved solution for generating depth maps using time-of-flight measurements is described, more specifically a time-of-flight imager and a time-of-flight imaging method with an improved accuracy. A depth correction profile is applied to the measured depth maps, which takes into account propagation delays within an array of pixels of a sensor of the time-of-flight imager.

12 Claims, 6 Drawing Sheets

(56) References Cited

U.S. PATENT DOCUMENTS

| | | | |
|---|---|---|---|
| 2003/0131334 A1* | 7/2003 | Suaya et al. | 716/12 |
| 2004/0039285 A1* | 2/2004 | Ustuner et al. | 600/459 |
| 2004/0245315 A1* | 12/2004 | Maev et al. | 228/8 |
| 2006/0143586 A1* | 6/2006 | Suaya et al. | 716/13 |
| 2006/0279450 A1* | 12/2006 | Annan et al. | 342/22 |
| 2007/0000328 A1* | 1/2007 | Buttram | 73/597 |
| 2008/0036996 A1* | 2/2008 | O'Connor et al. | 356/5.01 |
| 2008/0187305 A1 | 8/2008 | Raskar et al. | |
| 2009/0013300 A1* | 1/2009 | Suaya et al. | 716/13 |
| 2009/0091738 A1 | 4/2009 | Morcom | |
| 2009/0159804 A1* | 6/2009 | Shibuya et al. | 250/363.03 |
| 2010/0026850 A1 | 2/2010 | Katz | |
| 2010/0053592 A1* | 3/2010 | Yahav et al. | 356/4.01 |
| 2010/0103311 A1* | 4/2010 | Makii | 348/369 |
| 2011/0025827 A1* | 2/2011 | Shpunt et al. | 348/47 |
| 2011/0122275 A1* | 5/2011 | Kawai et al. | 348/222.1 |
| 2011/0205522 A1* | 8/2011 | Snow et al. | 356/5.01 |
| 2012/0039525 A1* | 2/2012 | Tian et al. | 382/154 |
| 2012/0044476 A1* | 2/2012 | Earhart et al. | 356/4.01 |
| 2013/0106837 A1* | 5/2013 | Mukherjee et al. | 345/419 |
| 2013/0147937 A1* | 6/2013 | Ren et al. | 348/78 |
| 2013/0147977 A1* | 6/2013 | Ren et al. | 348/208.6 |

FOREIGN PATENT DOCUMENTS

| | | |
|---|---|---|
| JP | 2000502447 | 2/2000 |
| JP | 2001153624 | 6/2001 |
| JP | 2001275132 | 10/2001 |
| JP | 2002202122 | 7/2002 |
| JP | 2008128792 | 6/2008 |
| WO | WO 2005/036372 | * 12/2004 |
| WO | WO2005036372 | 4/2005 |
| WO | WO2009135952 | 11/2009 |

OTHER PUBLICATIONS

EP Search Report dated Feb. 23, 2011.

EP Search Report dated Dec. 3, 2010.

Zhang et al., "Recovery of 3D depth map from image shading for underwater applications", Oceans '97. MTS/IEEE Conference Proceedings, vol. 1, Oct. 6, 1997, pp. 618-625.

Mancini et al., "3D shape and light source location from depth and reflectance; Computer Vision and Pattern Recognition", Proceedings CVPR 1992., 1992 IEEE Computer Society Conference, Jun. 15, 1992, pp. 707-709.

Azuma et al., "Real-time active range finder using light intensity modulation", SPIE, vol. 3640; Jan. 1999, pp. 11-20.

* cited by examiner

TIME-OF-FLIGHT IMAGER

This application claims the benefit, under 35 U.S.C. §119 of EP Patent Application 10305613.1, filed 9 Jun. 2010.

FIELD OF THE INVENTION

The present invention relates to an improved solution for generating depth maps using time-of-flight measurements, and more specifically to a time-of-flight imager and a time-of-flight imaging method with an improved accuracy.

BACKGROUND OF THE INVENTION

For the generation of 3D video content it is important to measure the distance of objects located in a scene that is being captured in addition to the usual video data. For this purpose a so-called depth map is determined. Typically a time-of-flight imager is used for this purpose, i.e. a measurement system that creates distance data with help of the time-of-flight principle. The time-of-flight imager includes a light source and a light sensor, which consists of an array of pixels. To measure a depth map, the light source is triggered with a pulse, and all pixels of the sensor are simultaneously triggered with a Transfer Gate (TG) pulse and a Global Shutter Gate (GSG) pulse. For details see K. Fife et al.: "A 0.5 µm pixel frame-transfer CCD image sensor in 110 nm CMOS", 2007 IEEE International Electron Devices Meeting, Vol. 35 (2007), pp. 1003-1006.

Also, WO 2009/135952 discloses methods and sensors for time-of-flight measurements. The sensors are adapted to achieve efficient background radiation suppression at variable background radiation conditions.

Not only background radiation reduces the accuracy of the depth map measurement. To obtain an accurate depth map it is likewise important that the temporal relations between the light source, the transfer gate pulse and the global shutter gate pulse are constant.

SUMMARY OF THE INVENTION

Accordingly, it is an object of the present invention to propose a solution for time-of-flight generation of depth maps, which achieves an improved accuracy.

According to the invention, this object is achieved by a time-of-flight imager for measuring a depth map of an object, with a light source for illuminating the object and a sensor with an array of pixels for detecting light reflected by the object to obtain a measured depth map, wherein the time-of-flight imager is adapted to apply a depth correction profile to the measured depth map.

Similarly, a method for measuring a depth map of an object with a time-of-flight imager has the steps of:
 illuminating the object with light emitted by a light source;
 detecting light reflected by the object with a sensor having an array of pixels to obtain a measured depth map; and
 applying a depth correction profile to the measured depth map.

Despite a minute control of the temporal relations between the light source, the transfer gate and the global shutter gate pulse, especially for sensors with a large number of pixels the measured depth maps are not satisfactory. It has been found that this is caused by the sensor of the time-of-flight imager, namely by the varying electrical path lengths to the different pixels of the sensor. The transfer gate pulse and the global shutter gate pulse travel along the same path. There is thus no significant shift between these pulses. However, the temporal relation of these pulses with regard to the light source trigger pulse varies across the array of pixels of the sensor, i.e. the pulses are subject to a propagation delay across the array of pixels. A further contribution to the propagation delay stems from the horizontal and vertical drivers of the sensor. The exact propagation delay depends on the location of a pixel within the array of pixels, but can easily be in the range of 10 to 20 ns. In the following this effect is referred to as 'shading'.

As light travels at a speed of $3\times10^9$ m/s, a distance of 1 m will delay the light by 3.3 ns. To measure this distance with a time-of-flight imager, the light has to travel back to the imager, thus a distance of 1 m results in a delay of 6.6 ns. Consequently, a propagation delay difference across the imager of 20 ns results in an error of 3 m. Apparently the propagation delay of the pulses across the imager has a large impact on the accuracy of the measurement. As the size of the imager becomes larger, the problem of propagation delays increases. A straightforward option to address this problem is to optimize the horizontal and vertical drivers of the sensor for higher speed and lower propagation delay. However, this increases the cost of the sensor and hence of the time-of-flight imager. In addition, a residual delay remains despite the optimized drivers.

The solution according to the invention solves the problem of propagation delays by correcting the errors in the depth map, which result from the propagation delays, with a depth correction profile. The solution has the advantage that it can be implemented at low cost while ensuring that depth maps with an improved accuracy are generated. In addition, by making the depth correction profile adjustable it becomes possible to cope with effects caused by aging of the sensor or by environmental changes.

Advantageously, the depth correction profile is a superposition of two $n^{th}$ order polynomials. A first of the two polynomials has a line number of the sensor as an input value, whereas a second of the two polynomials has a pixel number of a line of the sensor as an input value. Preferably two $2^{nd}$ order polynomials are used, as this is generally sufficient both in line direction and column direction of the sensor. The superposition of the two polynomials results in a 3D depth correction profile, which is subtracted from the measured depth map to obtain a corrected depth map. Of course, it is likewise possible to use different orders for the two polynomials.

Preferably, the depth correction profile is retrieved from a memory, e.g. from a look-up table. This has the advantage that only a rather limited amount of processing power is needed. Alternatively, the depth correction profile is calculated on the fly based on the polynomials. In this case coefficients of the polynomials are favorably retrieved from a memory. Though the latter solution requires more processing power, the necessary amount of memory is reduced. In order to cope with environmental changes, e.g. changes in temperature or humidity, depth correction profiles for different environmental conditions are favorably available in the memory. In this case the time-of-flight imager includes corresponding sensors, e.g. a temperature sensors and a humidity sensor, to select the appropriate depth correction profile.

The depth correction profile is preferably determined by measuring a depth map of a known object and comparing the measured depth map with an expected depth map. More specifically, for determining the depth correction profile the following steps are carried out:
 illuminating a flat surface, which is parallel to the sensor of the time-of-flight imager and located at a known distance from the time-of-flight imager, with light emitted by a light source;

detecting light reflected by the flat surface with the sensor to obtain a measured depth map; and determining the depth correction profile from the measured depth map.

Favorably, the depth correction profile is determined from the measured depth map by:

performing line averaging on lines of the sensor;

fitting an $n^{th}$ order polynomial to the averaged line values to determine a first of two polynomials;

subtracting the averaged line values from the measured depth map;

performing column averaging on columns of the sensor; and fitting an $n^{th}$ order polynomial to the averaged column values to determine a second of the two polynomials.

In this way the depth correction profile is determined in an easy manner.

Alternatively, the depth correction profile is obtained by subtracting an expected depth map of the known object from the measured depth map. For this purpose advantageously the average of multiple measurements is determined. In this case it is not necessary to fit any functions to the depth correction profile. However, the depth correction profile will be less smooth, as in this case the noise caused by measurement tolerances has more influence on the final depth correction profile.

In addition, instead of determining the depth correction profile from a depth map measured for a well defined object, i.e. a flat surface, it is likewise possible to directly measure or at least approximately calculate the propagation delays of the transfer gate pulse and the global shutter gate pulse within the array of pixels of the sensor. The determined delays are then transformed into depth values.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
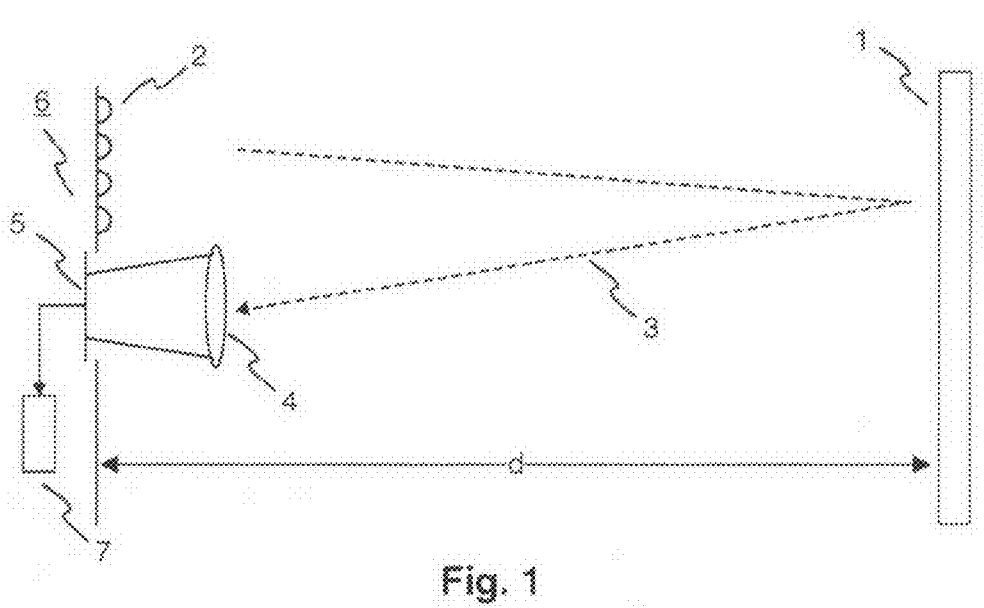
FIG. 1 illustrates the principle of a time-of-flight imager according to the invention.

FIG. 1 illustrates the principle of a time-of-flight imager 6 according to the invention. The time-of-flight imager 6 includes a light source 2, a lens 4, a sensor 5, and processing circuitry 7. An object 1 located at a distance d of 75 cm from the time-of-flight imager 6 is illuminated by the light source 2, e.g. a 4×4 array of infrared LEDs. The object 1 has a flat surface facing an array of pixels of the sensor 5. The light 3 reflected by this flat surface is collected by the lens 4 and imaged onto the array of pixels of sensor 5. This allows to measure a depth map of the object 1. The processing circuitry 7 enables processing of the measured depth map.

Figure 2:
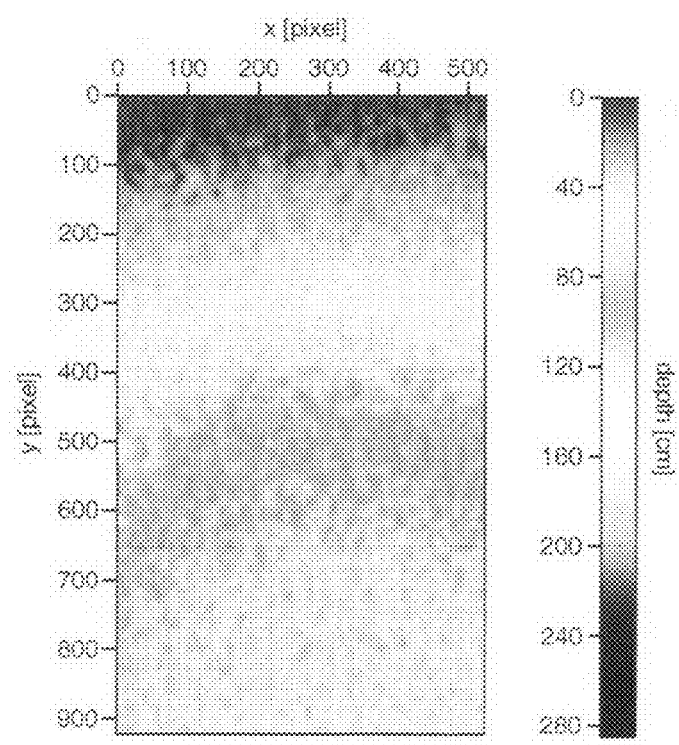
FIG. 2 depicts a depth map of a flat surface obtained with a conventional time-of-flight imager.

The depth map of the object 1 measured by the time-of-flight imager 6 is shown in FIG. 2. The grey values indicate the measured depth in cm. They are plotted against the pixels of the sensor 5 in x- and y-direction. Though the flat surface of the object 1 has a fixed distance d of 75 cm from the plane of the sensor 5, the resulting depth map is apparently not flat. Instead, it shows a distance that increases from the expected value in the bottom right corner both for decreasing y-pixels and decreasing x-pixels.

Figure 3:
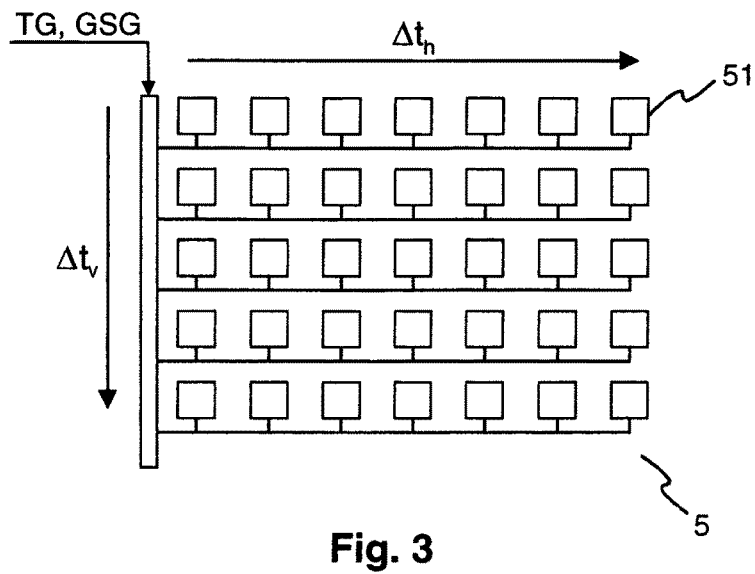
FIG. 3 explains the origin of propagation delays in the sensor of a time-of-flight imager.

An explanation for the non-flat depth map of FIG. 2 are propagation delays within the array of pixels of the sensor 5, as shall be explained in the following with reference to FIG. 3. The sensor 5 includes a plurality of pixels 51, which are arranged in lines and columns. The transfer gate pulse TG and the global shutter gate pulse GSG need to travel from an input to the respective pixels 51. As can be seen the distances that the pulses have to cover vary for the different pixels 51. This leads to an increasing propagation delay $\Delta t_h$ in the horizontal direction as well as an increasing propagation delay $\Delta t_v$ in the vertical direction, i.e. the already addressed shading.

Figure 4:
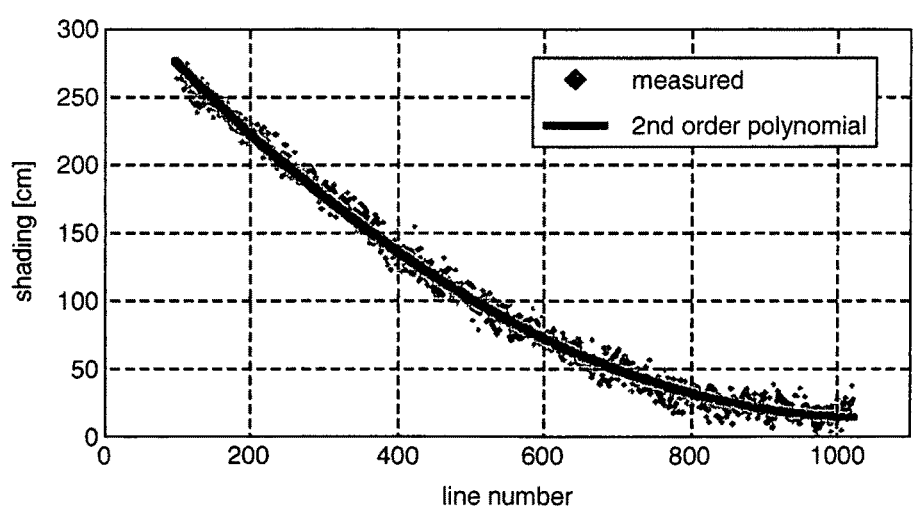
FIG. 4 shows a fit to the vertical shading with a $2^{nd}$ order polynomial.

It has been found that a $2^{nd}$ order polynomial allows to approximate the shading effect. FIG. 4 depicts measured values of the amount of vertical shading in cm against the line number, as well a $2^{nd}$ order polynomial fit to the measured values. The amount of vertical shading is found by line averaging.

Figure 5:
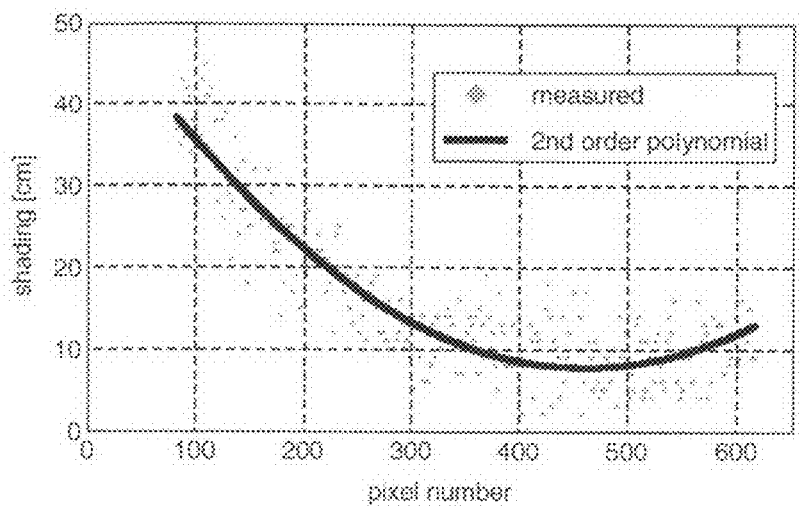
FIG. 5 shows a fit to the horizontal shading with a $2^{nd}$ order polynomial.

Similarly, as can be seen in FIG. 5, also the horizontal shading effect can be approximated by a $2^{nd}$ order polynomial. The amount of horizontal shading is found by subtracting the line averaged image from the original image and then perform column averaging.

Figure 6:
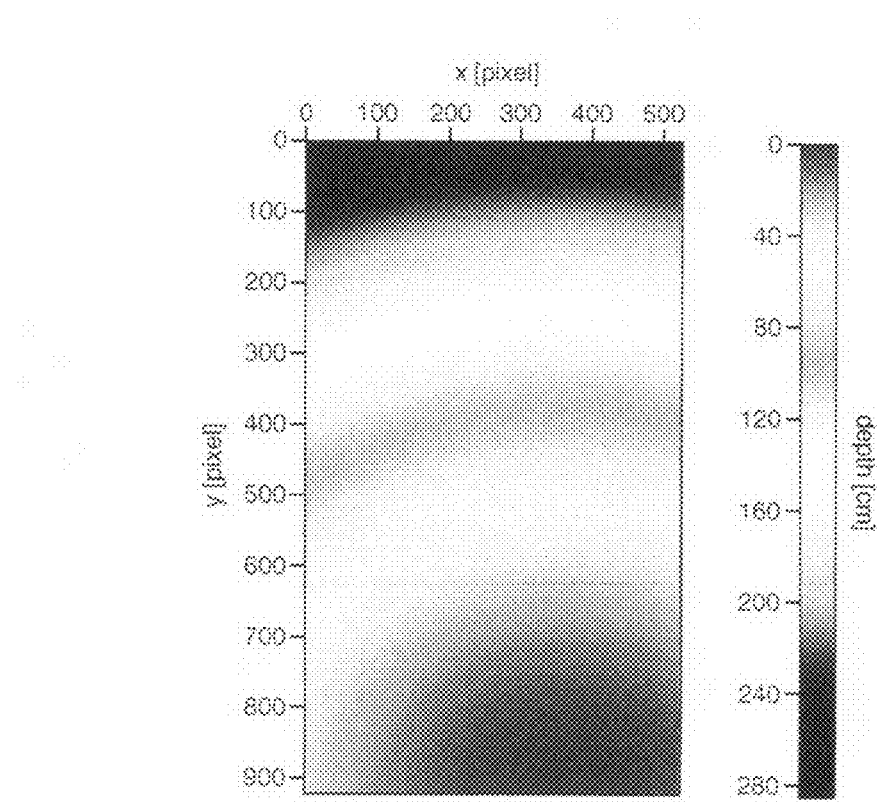
FIG. 6 depicts a depth correction map obtained by combining the $2^{nd}$ order polynomials of FIGS. 4 and 5.
Figure 7:
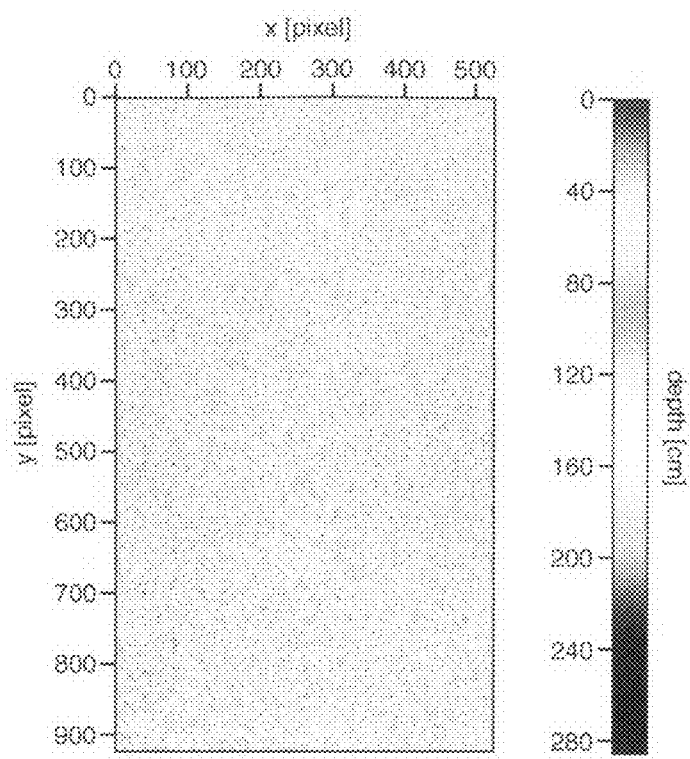
FIG. 7 depicts the depth map of FIG. 3 after correction with the depth correction map of FIG. 6.

The combination of the two $2^{nd}$ order polynomial obtained for horizontal shading and vertical shading, respectively, results in a 3D polynomial correction image, as illustrated in FIG. 6. This correction image is subsequently used by the circuitry 7 to correct any depth map obtained by the sensor 5. For example, FIG. 7 depicts the depth map of FIG. 3 after correction with the depth correction map of FIG. 6. Correction is performed by subtracting the correction image from the depth map measured by the time-of-flight imager 6. As can be seen, the corrected depth map shows the expected distance over the whole sensor area.

Figure 8:
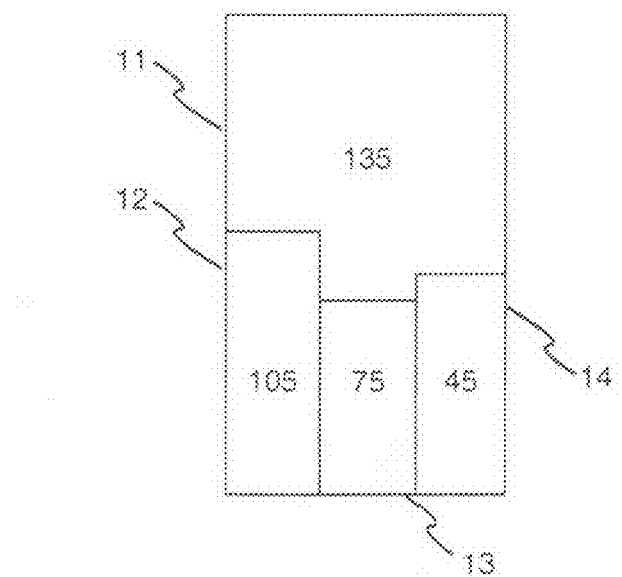
FIG. 8 shows an exemplary scene of four objects arranged in different depths.
Figure 9:
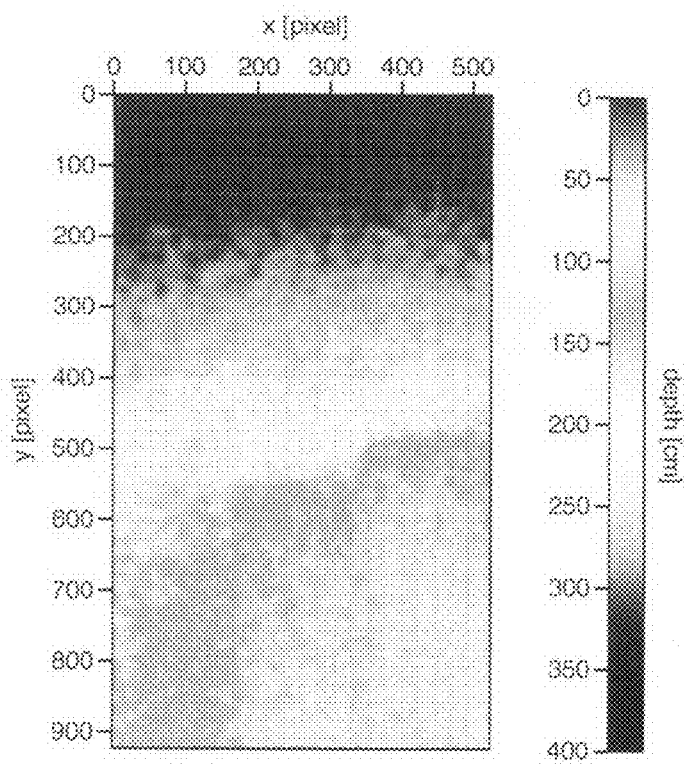
FIG. 9 shows a depth map of the scene of FIG. 8 obtained with a conventional time-of-flight imager.
Figure 10:
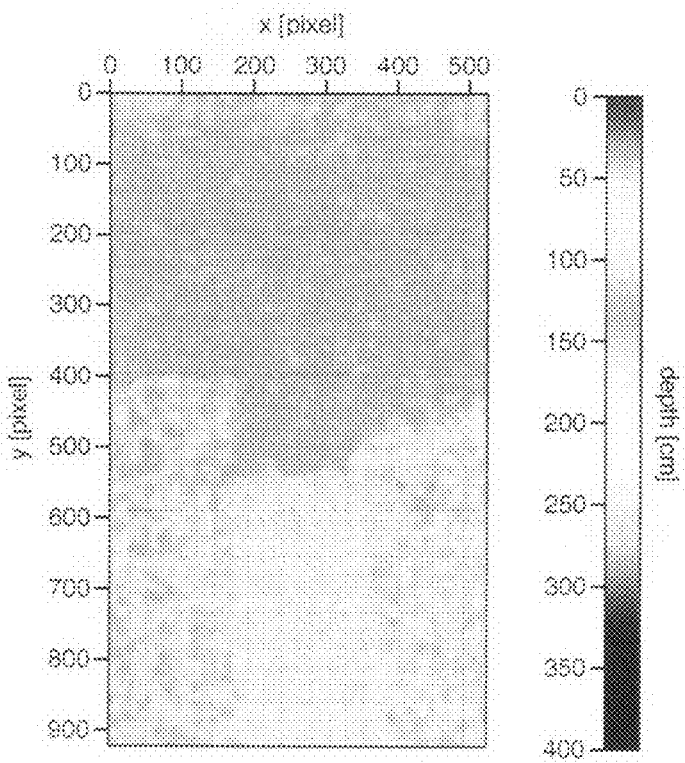
FIG. 10 depicts the depth map of FIG. 9 after correction with the depth correction map of FIG. 6.
Figure 11:
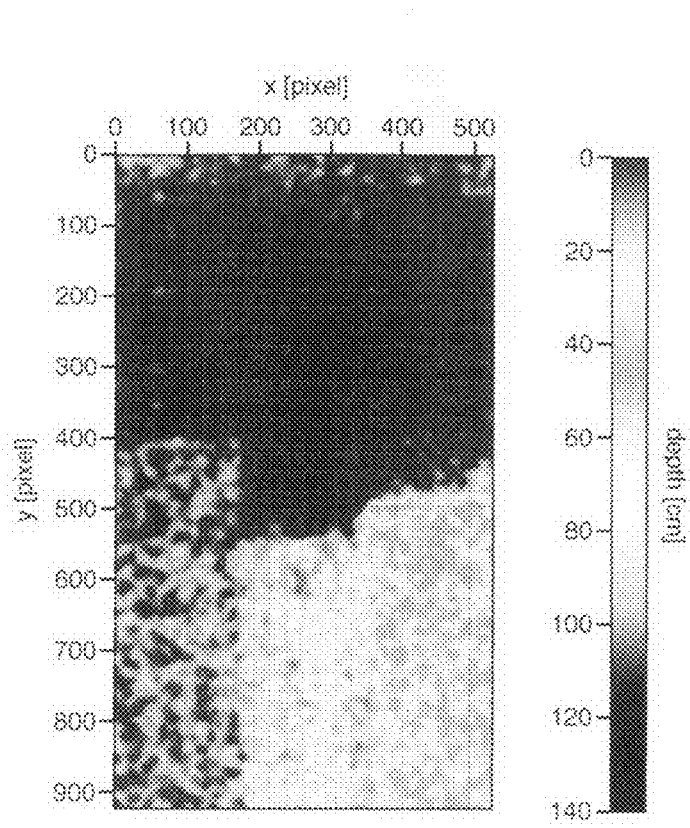
FIG. 11 shows a depth zoom into the corrected depth map of FIG. 10.

In the following the correction image shall be applied to a depth map measured by the time-of-flight imager 6 for an exemplary scene. The scene is illustrated in FIG. 8. Three objects 11, 12, 13, 14 are arranged at different distances from the time-of-flight imager 6, namely at 45 cm, 75 cm, 105 cm, and 135 cm. The original depth map of this scene obtained by the time-of-flight imager 6 is shown in FIG. 9. Again, due to the shading effect the distances measured for the different objects 11, 12, 13, 14 are not constant. However, after subtracting the correction image the corrected depth map of FIG. 10 is obtained. A zoom into this corrected depth map showing only a reduced depth range from 0 cm to 140 cm is depicted in FIG. 11. As can be seen, the distances of the different objects 11, 12, 13, 14 are essentially constant and fit to the expected distances.

What is claimed, is:

1. A time-of-flight imager configured to measure a depth map of an object comprising:
    a light source for illuminating the object, and
    a time-of-flight sensor with an array of pixels for detecting light reflected by the object to obtain a measured depth map comprising an array of depth values corresponding to different spatial coordinates of the object,
    wherein the time-of-flight imager is configured to apply a depth correction profile to the depth map measured from the reflected light detected with the sensor with the array of pixels, to compensate for signal propagation delays in the time-of-flight sensor with the array of pixels, said depth correction profile varying spatially in dependence on coordinates within the measured depth map to compensate for signal propagation delays in the sensor.

2. The time-of-flight imager according to claim 1, wherein the depth correction profile is a superposition of two $n^{th}$ order polynomials.

3. The time-of-flight imager according to claim 2, wherein a first of the two $n^{th}$ order polynomials has a line number of the sensor as an input value and a second of the two $n^{th}$ order polynomials has a pixel number of a line of the sensor as an input value.

4. The time-of-flight imager according to claim 1, wherein the depth correction profile is calculated on the fly or retrieved from a look-up table.

5. A method for measuring a depth map of an object with a time-of-flight imager, the method comprising:
    illuminating the object with light emitted by a light source;
    detecting light reflected by the object with a time-of-flight sensor having an array of pixels to obtain a measured depth map comprising an array of depth values corresponding to different spatial coordinates of the object; and
    applying a depth correction profile to the depth map measured from the reflected light detected with the sensor with the array of pixels, to compensate for signal propagation delays in the time-of-flight sensor with the array of pixels, said depth correction profile varying spatially in dependence on coordinates within the measured depth map to compensate for signal propagation delays in the sensor.

6. The method according to claim 5, wherein the depth correction profile is a superposition of two $n^{th}$ order polynomials.

7. The method according to claim 6, wherein a first of the two $n^{th}$ order polynomials has a line number of the sensor as an input value and a second of the two $n^{th}$ order polynomials has a pixel number of a line of the sensor as an input value.

8. The method according to claim 5, wherein the depth correction profile is calculated on the fly or retrieved from a look-up table.

9. A method for determining a depth correction profile for a time-of-flight imager, the method comprising:
    illuminating a flat surface, which is parallel to an array of pixels of a time-of-flight sensor of the time-of-flight imager and located at a known distance from the time-of-flight imager, with light emitted by a light source;
    detecting light reflected by the flat surface with the time-of-flight sensor to obtain a measured depth map comprising an array of depth values corresponding to different spatial coordinates of the flat surface; and
    determining the depth correction profile from the depth map measured from the light reflected by the flat surface and detected with the sensor with the array of pixels, to compensate for signal propagation delays in the time-of-flight sensor with the array of pixels, said depth correction profile varying spatially in dependence on coordinates within a measured depth m.

10. The method according to claim 9, wherein the depth correction profile is a superposition of two $n^{th}$ order polynomials.

11. The method according to claim 10, further comprising:
    performing line averaging on lines of the sensor;
    fitting an $n^{th}$ order polynomial to the averaged line values to determine a first of two polynomials;
    subtracting the averaged line values from the measured depth map;
    performing column averaging on columns of the sensor; and
    fitting an $n^{th}$ order polynomial to the averaged column values to determine a second of the two polynomials.

12. The method according to claim 9, further comprising the step of storing the depth correction profile in a look-up table.

* * * * *